(12) United States Patent
Wilens

(10) Patent No.: US 11,127,212 B1
(45) Date of Patent: Sep. 21, 2021

(54) METHOD OF PROJECTING VIRTUAL REALITY IMAGERY FOR AUGMENTING REAL WORLD OBJECTS AND SURFACES

(71) Applicant: Sean Asher Wilens, Teaneck, NJ (US)

(72) Inventor: Sean Asher Wilens, Teaneck, NJ (US)

( * ) Notice: Subject to any disclaimer, the term of this patent is extended or adjusted under 35 U.S.C. 154(b) by 4 days.

(21) Appl. No.: 16/547,321

(22) Filed: Aug. 21, 2019

Related U.S. Application Data

(63) Continuation-in-part of application No. 15/932,034, filed on Jan. 26, 2018, now Pat. No. 10,432,765.

(60) Provisional application No. 62/605,703, filed on Aug. 24, 2017.

(51) Int. Cl.
| | | |
|---|---|---|
| *G06T 19/00* | (2011.01) | |
| *G06T 17/20* | (2006.01) | |
| *H04N 9/31* | (2006.01) | |
| *G06K 9/00* | (2006.01) | |
| *H04N 5/225* | (2006.01) | |
| *G06T 7/70* | (2017.01) | |

(52) U.S. Cl.
CPC ........ *G06T 19/006* (2013.01); *G06K 9/00201* (2013.01); *G06T 7/70* (2017.01); *G06T 17/20* (2013.01); *H04N 5/2253* (2013.01); *H04N 9/3173* (2013.01); *H04N 9/3179* (2013.01); *G06T 2207/10016* (2013.01)

(58) Field of Classification Search
CPC combination set(s) only.
See application file for complete search history.

(56) References Cited

U.S. PATENT DOCUMENTS

| | | | |
|---|---|---|---|
| 6,937,210 B1 * | 8/2005 | MacDonald | A63J 25/00 345/1.1 |
| 8,547,401 B2 | 10/2013 | Mallinson et al. | |
| 8,907,982 B2 | 12/2014 | Zontrop et al. | |
| 8,917,289 B2 | 12/2014 | Fock et al. | |
| 8,933,965 B2 | 1/2015 | Tomite et al. | |
| 9,001,154 B2 | 4/2015 | Meier et al. | |
| 9,013,505 B1 | 4/2015 | Thornton et al. | |
| 9,214,137 B2 | 12/2015 | Bala et al. | |
| 9,449,343 B2 | 9/2016 | Mayerle et al. | |
| 9,721,391 B2 | 8/2017 | Monaghan et al. | |
| 9,728,007 B2 | 8/2017 | Hakkarainen et al. | |
| 10,127,724 B2 | 11/2018 | Carre et al. | |
| 10,157,504 B1 | 12/2018 | Jain | |
| 10,762,812 B1 * | 9/2020 | Thornton | G09G 3/003 |
| 2004/0111024 A1 * | 6/2004 | Zheng | A61B 6/547 600/426 |

(Continued)

FOREIGN PATENT DOCUMENTS

| | | | | |
|---|---|---|---|---|
| CN | 105183823 B | * | 7/2018 | ............ G06F 17/30 |
| WO | WO-2010027291 A | * | 3/2010 | ........... H04N 9/3179 |

*Primary Examiner* — Zhitong Chen
(74) *Attorney, Agent, or Firm* — Natter & Associates, P.C.; Howard Natter

(57) ABSTRACT

A method of augmenting real world objects and surfaces with projected virtual imagery. A camera interfaced with a projector, captures an image of the object or the surface in real time and a software application generates the three-dimensional positional location of the object or surface with respect to the camera. This information is transmitted to the projector together with selected virtual imagery. The camera and projector are positioned for synchronized movement for aiming the projected virtual imagery on the real world object or surface.

9 Claims, 3 Drawing Sheets

(56) References Cited

U.S. PATENT DOCUMENTS

| | | | |
|---|---|---|---|
| 2006/0064006 A1* | 3/2006 | Strommer | A61B 8/12 600/415 |
| 2012/0099756 A1* | 4/2012 | Sherman | G07G 1/0063 382/100 |
| 2013/0069940 A1* | 3/2013 | Sun | G09B 19/003 345/419 |
| 2013/0265330 A1* | 10/2013 | Goto | G02B 27/0172 345/632 |
| 2014/0195983 A1* | 7/2014 | Du | G06K 9/00201 715/849 |
| 2015/0121287 A1* | 4/2015 | Fermon | G06F 3/017 715/773 |
| 2015/0238362 A1* | 8/2015 | Chayet | G02B 26/101 348/63 |
| 2016/0044298 A1* | 2/2016 | Holz | H04N 5/2253 348/47 |
| 2016/0063713 A1* | 3/2016 | Okamoto | G06T 7/74 345/419 |
| 2016/0306384 A1* | 10/2016 | Carvey | G06F 1/1607 |
| 2017/0258526 A1* | 9/2017 | Lang | A61F 2/32 |
| 2017/0322513 A1* | 11/2017 | Zapanta | G02B 30/56 |
| 2018/0101966 A1* | 4/2018 | Lee | G06T 9/001 |
| 2018/0122143 A1* | 5/2018 | Ellwood, Jr. | H04N 9/31 |
| 2018/0129167 A1* | 5/2018 | Maimone | G02B 27/0025 |
| 2018/0368921 A1* | 12/2018 | Jeszenszky | A61B 34/25 |
| 2019/0007672 A1* | 1/2019 | Burrough | G06T 7/20 |
| 2019/0101405 A1* | 4/2019 | Feng | G01C 21/3638 |
| 2019/0160356 A1* | 5/2019 | Lalaoua | G09F 23/0066 |
| 2019/0361392 A1* | 11/2019 | Trim | G02B 30/56 |
| 2020/0138518 A1* | 5/2020 | Lang | A61B 90/37 |
| 2020/0202737 A1* | 6/2020 | Aiyer | G06Q 10/10 |
| 2020/0211275 A1* | 7/2020 | Eshima | G06T 7/50 |
| 2020/0226838 A1* | 7/2020 | Goergen | G06F 3/14 |
| 2020/0233561 A1* | 7/2020 | Kline | G06F 3/0482 |
| 2020/0242335 A1* | 7/2020 | Eshima | G06K 9/00912 |

\* cited by examiner

METHOD OF PROJECTING VIRTUAL REALITY IMAGERY FOR AUGMENTING REAL WORLD OBJECTS AND SURFACES

RELATED APPLICATION

This application claims priority from U.S. Provisional Patent Application Ser. No. 62/605,703 filed Aug. 24, 2017 and is a continuation in part of patent application Ser. No. 15/932,034 now U.S. Pat. No. 10,432,765 filed Jan. 26, 2018 the contents of both applications are incorporated herein by reference.

BACKGROUND OF THE INVENTION

Field of the Invention

This invention relates generally to computer graphics processing and especially to placing generated data in real scene.

In particular, this invention concerns a method of projecting virtual content on real world objects and surfaces.

DESCRIPTION OF THE RELATED ART

Augmented reality is live direct or indirect viewing of a physical real-world environment, augmented by virtual computer-generated images. Typically, a viewer experiences augmented reality imagery through the use of goggles, wearable eyeglasses or other head-mounted viewing devices. A limitation of these viewing devices is that although the augmented objects are in the viewer's field of view; such as on a display screen, they are not integrated into the viewer's environment and the viewer does not experience a real-world scene. A further disadvantage of these augmented reality viewing devices is the physical limitation of placing lenses in a headset; the issue of generating the computing power needed to process and display the digital objects with reasonable high fidelity and resolution; and the viewer's limited and rather narrow field of view as compared to the usual human field of view.

Another method for presenting augmented reality is where physical objects and/or surfaces are augmented with virtual images that are integrated directly in the viewer's environment, not simply in their visual field. This is accomplished by projecting virtual imagery that is superimposed on the real-world objects or surface scenes to create the impression that the virtual imagery is part of the viewer's environment. A shortcoming of some of these methods is that multiple projectors requiring complex three-dimensional projection are needed. An additional problem inherent with these projection systems is the difficulty to obtain coincident alignment of the projected virtual images as superimposed on the real world object or surface scene. This problem occurs because of the numerous parameters such as attitude and the distance to the object from the camera in the physical real-world environment. One solution for determining the relationship between the position of the camera and the object has been to use markers with a known pattern that can easily be identified. The markers are positioned in the real-world environment. When the augmented reality system later analyzes the images these markers can be identified and used to calculate the relation between the camera and the markers. This information is then used to determine how the image should be projected. A disadvantage of this solution is that it requires markers in the physical real-world environment.

In another method, the image of a real world object is configured with an identification markers that are associated with an algorithm used to extract a set of features from the image to determine how the camera is observing the object in the real world. This system is somewhat complex and difficult to use.

As a result, there is a need for an improved method for projecting augmented reality imagery on real world objects and surfaces that is not subject to the above limitations, disadvantages, or shortcomings.

BRIEF SUMMARY OF THE INVENTION

Briefly, this invention concerns a method of projecting computer generated virtual image content on various real-world objects. As used hereinafter the term "objects" also includes planar surfaces such as walls, floors as well as curved, contoured and similar surfaces. The method utilizes a visual input device, such as a mobile phone internal camera, having light sensitivity functionality to detect varying shades of light, dark and color tones that are processed by a software application to spatially locate the three-dimensional (3D) coordinates of real-world objects. A digital laser projector or LED projector is interfaced with and is configurable in registered alignment with the camera. A software application hides the 3D coordinates and masks the camera video feed so that the software application sends only selected 3D virtual image content from stored memory to the projector for projecting the 3D virtual content in overlying relationship on the real-world objects. Adjustments can be made to the positioning of the camera and/or projector within the real world environment so that the 3D virtual content is in sync with the 3D coordinates. In an alternative embodiment, the 3D coordinates of the real world object are determined by a digital camera feed to input the 3D coordinates from a software application user interface, rather than by using light sensitivity functionality. Preferably, the digital camera/video and software application are incorporated in a smartphone, tablet, or computer. Both the camera and projector are adjustably mounted in a frame member for accomplishing registered alignment between the camera lens and projector lens. Adjustments to the lighting, color, and distance of the projected content and opacity can be varied to create a stronger or weaker illusion, to enhance or manipulate the real world color, as well as to camouflage the surrounding footage with a black radial gradient to avoid a square-like frame projection and/or to isolate objects within the projected 3D content.

Having thus summarized the invention, it will be seen that it is a preferred object thereof to provide a novel and improved method of projecting virtual reality imagery for augmenting real world objects and surfaces that is not subject to the aforementioned limitations, disadvantages, or shortcomings.

Accordingly, it is a preferred object of this invention to provide a novel and improved method of projecting virtual reality imagery for augmenting real world objects and surfaces that are within the viewer's real world environment.

Another preferred object of this invention is to provide a novel and improved method of projecting virtual reality imagery for augmenting real world objects and surfaces that utilizes light sensitivity functionality to spatially locate the real world objects and surfaces.

Yet another preferred object of this invention is to provide a novel and improved method of projecting virtual reality imagery for augmenting real world objects and surfaces that does not require special viewer eyewear or headsets.

Still another preferred object of this invention is to provide a novel and improved method of projecting virtual reality imagery for augmenting real world objects and surfaces that does not require multiple projection devices.

The above preferred objects and other aspects and features of the invention will become apparent and the invention will be best understood by referring to the following description as more fully described with reference to the accompanying drawings and the scope of which is more particularly pointed out and indicated in the appended claims.

BRIEF DESCRIPTION OF THE DRAWINGS

In the accompanying drawings, wherein there is shown an exemplary embodiment of the method of this invention.

DETAILED DESCRIPTION OF THE INVENTION

With specific reference now to the drawings, it is stressed that the particulars shown are by way of example and for the purposes of illustrative discussion of the present invention and is presented in the cause of providing what is believed to be the most useful and readily understood description of the principles and conceptual aspects of the invention. In this regard no attempt is made to show aspects of the invention in more detail than is necessary for a fundamental understanding of the invention, the description taken with the drawings making apparent to those skilled in the art how the invention may be embodied in practice.

Figure 1:
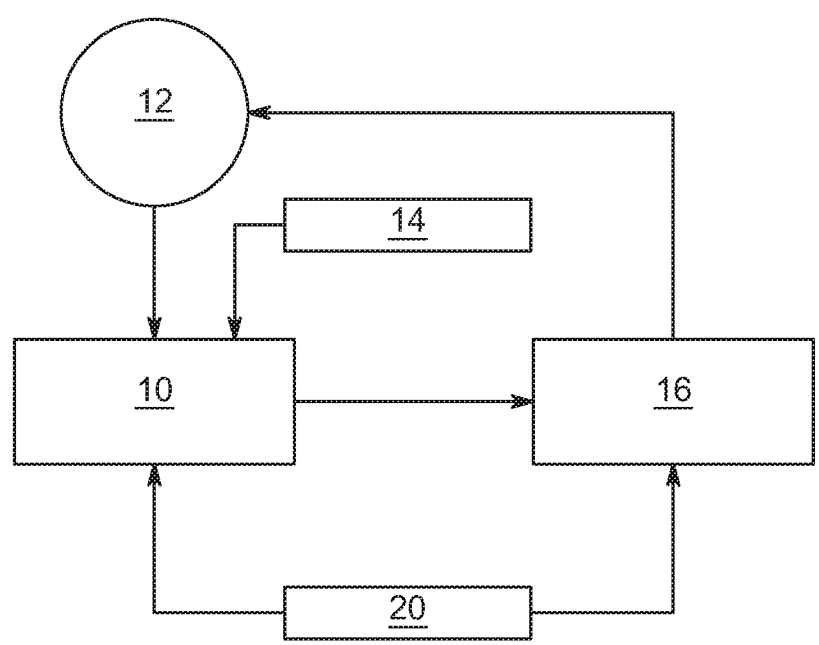
FIG. 1 is a schematic illustration depicting the method for projecting virtual reality imagery for augmenting real world objects and surfaces in accordance with this invention.

Referring now to the drawings, FIG. 1 is a simplified schematic for illustrating the method of this invention. Reference numeral 10 represents an image capture device such as a smartphone camera or other portable mobile terminal device having an internal camera.

In accordance with the method of this invention, the camera 10 is used to capture an image in real-time of a real world object 12, such as illustrated by the mug in the drawings. A software application 14, that, for example, may be generated using a Unity 3D platform and software scripts such Vuforia®, 6D.AI, MultiAR, or equivalent software scripts, is downloaded to the camera 10 and functions to gather data from the camera video feed, such as light sensitivity functionalities, and tracking data of camera movement and orientation. This information generates data points of the object 12, that can be used with 3D modelling software to map out the three-dimensional geometry of the object 12, in the form of a mesh surface that provides an approximation of the shape of the object 12. Further detail of the object 12 can be supplied by a bitmap image or texture that is applied over the mesh surface using the 3D modelling software. This mesh texture provides a target for the virtual imagery content to interact with as will be further described hereinafter.

Further with reference to FIG. 1, the camera 10 is interfaced with a projector 16, preferably by wireless networking or by conventional wired connection. Additionally, the camera 10 and projector 16 are adjustably mounted to a frame support member 18 for registration of the projected virtual imagery content and the real-world object or surface; this is noted at 20.

In accordance with the method discussed, the above software scripts are modified, to hide the camera digital feed from being projected, such as by layering a black background over the digital video feed to mask the feed from view leaving only the mesh texture or selected scan lines where the three-dimensional content that is programmed to interact with the object will be displayed. In addition, options to reduce the opacity of the black background with gradient transparencies as well as filtering the digital video feed with blur effects and color manipulations can be used to enhance the appearance of the three-dimensional texture and the three dimensional objects to be projected.

Figure 2:
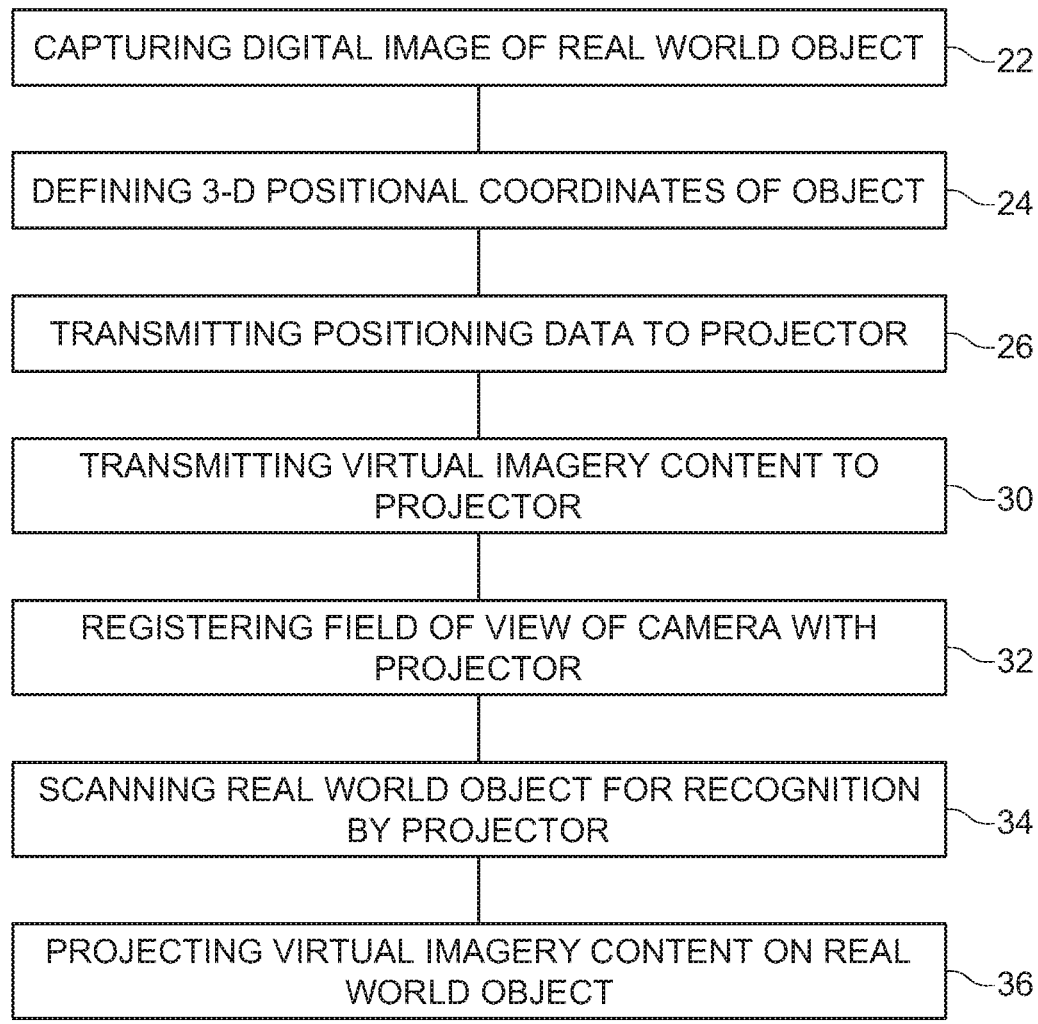
FIG. 2 is a flow chart showing the steps involved in practicing an exemplary method of this invention.
Figure 3:
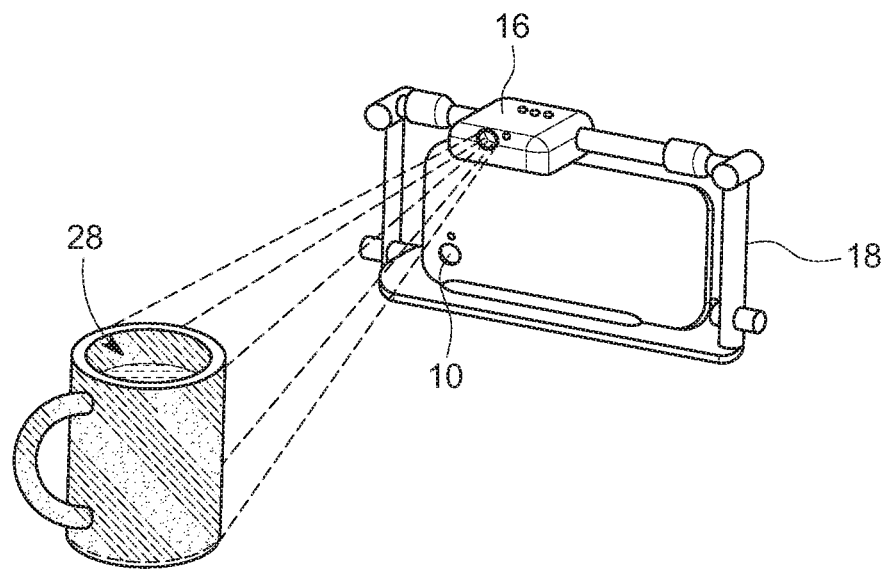
FIG. 3 is a pictorial view illustrating a three-dimensional mesh geometry defining the spatial positioning of the real world object with respect to the projector.

With reference now to FIG. 2 the flow chart will be discussed in connection with the steps involved in the method of this invention. The camera 10 initially captures a selected digital image of a real world object or surface, such as the cup 12, denoted at 22. The software 14 is scripted to access the camera 10 and in this exemplary embodiment, uses light sensitivity functionality from the camera digital feed and/or other variables to define data points or location coordinates of the object 12 as it exists in real space, as is shown at 24. Alternatively, a software application using GPS or equivalent program, can define the 3D coordinates or vertices of the object. This information is transmitted to the projector 16, denoted at 26 and is used to map the three-dimensional geometry of the object referred to herein as the mesh texture 28, as illustrated in FIG. 3. Additionally, as shown at 30, selected virtual image content from a stored memory 10 is transmitted to the projector 16.

Figure 4:
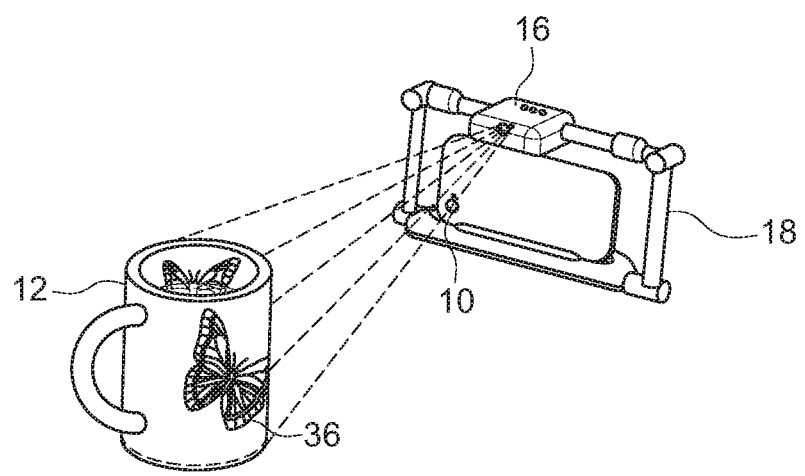
FIG. 4 is a pictorial view illustrating virtual imagery content superimposed on a real world object.

The next step is to synchronize the camera 10 and the projector 16 such that the respective lens of each are registered to focus on the same real world image. This is shown in step 32 and is accomplished by the slidable and/or pivotal movement provided by the jointed hand-held frame member 18 as discussed in co-pending application Ser. No. 15/932,034, now U.S. Pat. No. 10,432,765. In an alternative arrangement, the camera 10 and projector 16 can be mounted on a tripod to achieve similar orientations. By way of further explanation, the software application in this exemplary embodiment, features a target and a dot that appears on a display screen of the camera 10. The viewer is prompted to move the dot within the target by pivoting or otherwise moving the projector 16. When properly aligned the projector 16 and the camera 10 will move in synchronization. The software application will then prompt the viewer to begin scanning the real-world environment with the camera 10 as noted at 34. As the projector 16 recognizes the coincidence of the object 12 within the bounds of the three-dimensional mesh texture 28, it projects the virtual imagery content within the three dimensional coordinates in the real world. This step is noted at 36 and is illustrated in FIG. 4. The software continuously uses the coordinates defined by the mesh texture 28 to situate and place the virtual image on the targeted spatially recognized objects or surfaces. It should be noted that the projected image will conform to the contours of the object 12.

The method of the above described invention may be embodied in and applied to gaming, education, business and/or entertainment applications. For example, the software can be adapted for educational purposes, and designed to show the internal human anatomy through virtual image content projected on the skin of the human body.

Although the foregoing invention has been described in some detail for purposes of clarity of understanding, it will be apparent that certain changes and modifications may be practiced within the scope of the appended claims. Accordingly, the present method, process and system, is to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

Having described the invention, there is claimed as new and desired to be secured by Letters Patent:

1. A method of projecting virtual imagery on real world objects using a digital camera interfaced with a digital projector, comprising the steps of:
   a) capturing an image of a real-world object with the camera by generating a digital video feed in real time;
   b) defining the spatial positioning of the object relative to the camera;
   c) utilizing the spatial positioning for rendering a three-dimensional mesh texture;
   d) transmitting the three-dimensional mesh texture to the projector;
   e) selectively transmitting virtual imagery content to the projector;
   f) synchronizing movement of the camera and the projector to position a respective lens of the camera and of the projector in registered alignment for focusing on the same real world object;
   g) scanning the real-world environment with the camera and simultaneously focusing the camera and the projector on the previously captured real world object;
   h) recognizing the coincidence of the real world object within the three dimensional mesh texture in the projector; and
   i) projecting the virtual imagery content in the projector in a three dimensional superimposed relationship integrated onto the real world object.

2. A method of projecting virtual imagery on real world objects as claimed in claim 1 wherein the projected virtual imagery content is at least one of a unitary image, a plurality of images, and a series of images that create the appearance of live movement.

3. A method of projecting virtual imagery on real world objects as claimed in claim 1 wherein light sensitivity software is used to define the spatial positioning of the object relative to the camera.

4. A method of projecting virtual imagery on real world objects as claimed in claim 1 wherein the spatial positioning of the object is defined by a software application utilizing an input from the digital camera feed.

5. A method of projecting virtual imagery on real world objects as claimed in claim 1 wherein the digital feed transmitted to the projector is masked including the mesh texture defining the positioning of the object.

6. A method of projecting virtual imagery on real world objects as claimed in claim 1 wherein the projected virtual imagery is viewable on the real world object without need for an optical viewing device.

7. A method of projecting virtual imagery on real world objects as claimed in claim 1 wherein the real world object is captured in three dimensions and the virtual imagery is projected on the object in three dimensions.

8. A method of projecting virtual imagery directly on objects and surfaces in a physical real world environment of a viewer without requiring an optical head-mounted display device for viewing the projected images, comprising the steps of:
   a) capturing an image of at least one of a real-world object and surface with a camera to generate a video feed in real time;
   b) defining the spatial positioning data of the image relative to the camera;
   c) utilizing the spatial positioning data for rendering a three dimensional mesh texture of the real world image;
   d) transmitting the three-dimensional mesh texture to a projector;
   e) selectively transmitting virtual imagery content to the projector;
   f) coordinating directional movement of the camera and the projector;
   g) registering the field of view of the camera with that of the projector for concurrent viewing of the same real world image;
   h) scanning the real-world environment with the camera for locating at least one of the real-world object and surface;
   i) recognizing the coincident of at least one of the real world object and surface in the projector's three-dimensional mesh texture; and
   j) projecting the three-dimensional virtual imagery content upon at least one of the real world object and surface.

9. A method of projecting virtual imagery on real world objects as claimed in claim 8 wherein the projected virtual imagery content conforms to the contours of at least one of the real world object and surface.

* * * * *